United States Patent
Corbin

(12) 
(10) Patent No.: US 6,306,198 B1
(45) Date of Patent: Oct. 23, 2001

(54) METHOD OF SEPARATING AND SELECTIVELY REMOVING HYDROGEN CONTAMINANT FROM HYDROGEN-CONTAINING PROCESS STREAMS AND COMPOSITIONS USEFUL THEREFOR

(76) Inventor: David Richard Corbin, 1140 Presidential Dr., Wilmington, DE (US) 19807

( * ) Notice: Subject to any disclaimer, the term of this patent is extended or adjusted under 35 U.S.C. 154(b) by 0 days.

(21) Appl. No.: 09/424,980

(22) PCT Filed: Jun. 2, 1998

(86) PCT No.: PCT/US98/11564

§ 371 Date: Dec. 2, 1999

§ 102(e) Date: Dec. 2, 1999

(87) PCT Pub. No.: WO98/55206

PCT Pub. Date: Dec. 10, 1998

Related U.S. Application Data

(60) Provisional application No. 60/048,503, filed on Jun. 4, 1997.

(51) Int. Cl.[7] .................................................. B01D 53/047
(52) U.S. Cl. ................................. 95/103; 95/116; 95/902; 96/108
(58) Field of Search ............................... 95/116, 96, 103, 95/902; 96/108

(56) References Cited

U.S. PATENT DOCUMENTS

| | | | |
|---|---|---|---|
| 4,466,812 | * | 8/1984 | Takaishi et al. ........................ 95/116 |
| 4,585,640 | * | 4/1986 | Desmond et al. .................... 423/329 |
| 4,795,853 | * | 1/1989 | Miller et al. .......................... 585/733 |
| 5,124,500 | * | 6/1992 | Clark et al. ......................... 95/116 X |
| 5,944,876 | * | 8/1999 | Corbin et al. ........................... 95/116 |

FOREIGN PATENT DOCUMENTS

| | | | |
|---|---|---|---|
| 0937750 | * | 9/1963 | (GB) . |
| WO97/46315 | * | 12/1997 | (WO) . |

OTHER PUBLICATIONS

D. R. Corbin et al., "Flexibility of the Zeolite RHO Framework. In Situ X–Ray and Neutron Powder Structural Characterization of Divalent Cation–Exchanged Zeolite RHO", *J. of American Chemical Society*, 112, 4821–4830, 1990.*

V. V. Krishnan et al, "Encapsulation Studies of Hydrogen on Cadmium Exchanged Zeolite Rho at Atmospheric Pressure", *Catalysis Today 31*, pp. 199–205, 1996.*

V. V. Krishnan et al., "Encapsulation of Hydrogen in Cadmium–Exchanged Zeolite rho; Temperature Programmed Diffusion Studies", *Chem. Commun.*, pp. 395–396, 1996.*

* cited by examiner

*Primary Examiner*—Robert H. Spitzer

(57) ABSTRACT

A method of separating and selectively removing hydrogen contaminant from hydrogen-containing product and by-product process streams is disclosed. Separation and removal occur when certain Cd containing zeolite, silica, alumina, carbon or clay compositions are placed in contact with a hydrogen-containing process stream. A hydrogen-encapsulated composition is formed by practice of the method. Also disclosed is a reversible storage method for hydrogen using the above-described compositions.

17 Claims, No Drawings

METHOD OF SEPARATING AND SELECTIVELY REMOVING HYDROGEN CONTAMINANT FROM HYDROGEN-CONTAINING PROCESS STREAMS AND COMPOSITIONS USEFUL THEREFOR

This application claims benefit of provisional application 60/048,503 filed Jun. 4, 1997.

FIELD OF INVENTION

The invention generally relates to separating and removing hydrogen contaminant from hydrogen-containing process streams and more particularly to selectively removing hydrogen from such process streams using Cd containing zeolite, silica, alumina, carbon and clay compositions.

BACKGROUND OF THE INVENTION

Zeolites are widely used as sorbents in many applications that use the zeolite's ability to entrap liquids and gases. One potential application is the development of zeolite storage materials for cases. In addition, zeolites offer the possibility of selective separation of gases from mixed streams.

Zeolites are crystalline aluminosilicates with framework structures. The framework structure contains channels and cages of molecular dimensions. Cations and small molecules can reside on or within the pores, cages or channels. Zeolite rho is a typical example, with a 3-dimensional network of alpha-cages (cubo-octahedra) which are connected to each other by octahedral prisms, or in other words, a body centered cubic structure of alpha cages. Selective blocking of pores in zeolites can be achieved by ion-exchanging the zeolites with different sized cations, thereby altering the sorption properties of the zeolite.

There have been several attempts to encapsulate hydrogen gas in various metal-exchanged zeolites. For example, Yoon and Heo (J. Phys. Chem. Vol. 96, pp. 4997–5000. 1992) studied encapsulation in $Cs_{2.5}$-zeolite A at pressures ranging from 10–129 atm (1.01–13.1 MPa) and temperatures ranging from 100–350° C., and achieved a maximum amount of 871 $\mu$mol/g of $H_2$ encapsulation.

Weitkamp et al. (*Proc. 9th Intl. Zeolite Conf.,* Montreal 1992, Eds. Ballmoos et al., Butterworth-Heinemann Pub. vol. 2, pp. 11–19) used various metal-exchanged zeolites including zeolite-rho. However, the largest amount of $H_2$ that they were able to encapsulate was 410 $\mu$mol/g using zeolite NaA at 300° C., and 10.0 MPa after 15 min. They were also only able to encapsulate 22.3 $\mu$mol/g of $H_2$ using zeolite H-rho under the same conditions.

Efstathiou et al. (J. of Catalysts, vol. 135, pp. 135–146, 1992) studied $H_2$ encapsulation in Cs. Ni, and Eu-exchanged zeolite A at 1 atm (0.1 MPa) and 37–300° C. They achieved the largest amount of $H_2$ encapsulation, 3.50 $\mu$mol/g, using NaA at 300° C.

Takaishi et al. U.S. Pat. No. 4,466,812) disclose a hydrogen encapsulating zeolite material composed of a Na zeolite A ion-exchanged with cesium and a divalent metal $H_2$ encapsulation was performed at 300° C. or less at pressures of 97 atm (9.8 MPa). No specific examples are provided for a composition containing Cd, although Cd is generally disclosed as one of the divalent metals.

What are needed are additional compositions capable of encapsulating hydrogen in larger amounts and at lower pressure than the prior art. In addition, a method of separating and selectively removing hydrogen from hydrogen-containing process streams using said compositions is also needed. Other objects and advantages of the present invention will become apparent to those skilled in the art upon reference to the detailed description of the invention which hereinafter follows.

SUMMARY OF THE INVENTION

The present invention provides a method of separating and removing hydrogen from a hydrogen-containing process stream comprising contacting a hydrogen-containing process stream with a Cd containing zeolite, silica, alumina carbon or clay composition, provided that the zeolite is not rho zeolite. Typically, the Cd containing composition contains at least about 1.6 wt % Cd. Included is a method for the reversible storage of hydrogen using the above compositions wherein stored hydrogen can be removed from the hydrogen-encapsulated compositions when desired and the compositions can be used repeatedly to store hydrogen and remove it when desired. This is accomplished by heating the hydrogen encapsulated composition to higher temperatures (e.g., greater than 100° C.) and/or by reducing the surrounding pressure.

Also included are the hydrogen-encapsulated compositions comprising Cd containing zeolite, silica, alumina, carbon and clay compositions that have been encapsulated with hydrogen, provided that the zeolite is not rho zeolite.

The Cd containing compositions can surprisingly separate and remove hydrogen from process streams in relatively large amounts even at lower pressures, (e.g., 1 atm; 0.101 MPa). Preferably, the hydrogen-containing process stream contains hydrogen contaminant in concentrations of from about 0.0001 to about 15 wt. %. Such streams could also contain other gases in addition to hydrogen such as, for example, HCl, HF, HBr, HI $Cl_2$, $N_2$, CO, $CO_2$, Ne, Ar, Kr, Xe, He, $NH_3$, $CH_4$, air and $H_2O$. The use of the above-defined Cd containing zeolite, silica, alumina, carbon or clay compositions allows for the selective removal of hydrogen when other gases are also present.

As used herein, "hydrogen" means elemental hydrogen (e.g., gaseous $H_2$) as well as isotopes thereof, including, for example, deuterium ($D_2$) and tritium.

As used herein, "clay" generally means naturally occurring or modified, small particle size hydrous aluminum silicates and magnesium silicates, usually containing a large variety of impurities, which exhibit plasticity when wet. Examples include, but are not limited to, kaolinite, halloysite, montmorillonite, illite, vermiculite and pyropbyllite. Their particle size is generally less than about 0.00016 inches (0.00041 cm).

DETAILED DESCRIPTION OF THE PREFERRED EMBODIMENTS

Zeolites can be generically described as complex aluminosilicates characterized by three-dimensional framework structures enclosing cavities occupied by ions and water molecules, all of which can move with significant freedom within the zeolite matrix. In commercially useful zeolites, the water molecules can be removed from or replaced with the framework structures without destroying the zeolite's geometry.

Zeolites can be generally represented by the following formula:

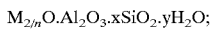

wherein M is a cation of valence n, $x \geq 2$, and y is a number determined by the porosity and the hydration state of the zeolite, generally from 0 to 8. In naturally-occurring zeolites, M is principally represented by Na, Ca, K, Mg and Ba in proportions their approximate geochemical abundance. The cations M are loosely bound to the structure and can frequently be completely or partially replaced with other cations by conventional ion exchange.

The dimensions which control access to the interior of the zeolite are determined not only by the tetrahedra forming a pore opening, but also by the presence or absence of ions in or near the pore. In the case of zeolite A, for example, access can be restricted by monovalent ions, such as $Na^+$ or $K^+$, which are situated in or near 8-ring openings as well as 6-ring openings. Access is enhanced by divalent ions, such as $Ca^{2+}$, which are situated only in or near 6-rings. Thus, KA and NaA exhibit effective pore openings of about 0.3 nm and 0.4 nm respectively, whereas CaA has an effective pore opening of about 0.5 nm.

The number of cationic species that can be present in a zeolite is dependent on the valence of the cationic species. The total positive charge of the cations must equal the total anionic charge of the $AlO_2$–units present; in other words, the metal cations present must be in such stoichiometric amounts to balance the electrostatic charge present The applicants have found that the above-described Cd containing zeolite compositions as well as Cd containing silica ($SiO_2$), alumina ($Al_2O_3$), carbon and clay compositions can be used in the s on and selective removal of hydrogen from hydrogen-containing process streams (e.g., in chemical and nuclear plants). This use would result in an inexpensive method for separating and selectively removing hydrogen gas from a mixture with other gases, something that is needed in the art.

To help illustrate some of the possible applications, several examples of industrial processes are detailed below where a separation and removal method, as described above, may be utilized. Typically, removal could occur from process and waste gaseous streams containing hydrogen in concentrations of from about 0.0001 to about 15 wt. % although this range is not considered critical. It is anticipated that such streams could contain, for example, HCl, HF, HI, HBr, $Cl_2$, $N_2$, CO, $CO_2$, Ne, Ar, Kr, Xe, He, $NH_3$, $CH_4$, air and $H_2O$ in addition to hydrogen.

Hydrodechlorinations of halocarbons produce one mole of HCl for every mole of $H_2$ consumed in the process. Since $H_2$ is typically used in excess, there is the potential for a by-product stream of HCl containing significant amounts of $H_2$. Examples of this are he thermal hydrodechlorination of halocarbons such as CFC-114a and halocarbon mixtures such as CFC-12/HCFC-22 in the presence of $H_2$, which produce high value products like HFC-134a and HFC-32, respectively. Details of such a thermal hydrodechlorination process are described, for example, in U.S. Pat. Nos. 5,208, 397; 5,300,713; 5,364,992; 5,430,204 and 5,446,219.

A by-product of the process is anhydrous HCl (AHCl) with $H_2$ as the major contaminant with as much as 3000 ppm (% wt). The presence of $H_2$ in the AHCl stream makes it difficult for the AHCl to be used directly as a feedstock for other processes such as oxychlorination. The value of the AHCl is lowered, and it has to be disposed of usually by contact/absorption in water, converting AHCl into aqueous HCl. The aqueous HCl is ultimately neutralized with lime or caustic for disposition as $CaCl_2$ or $NaCl_2$, respectively.

By-product AMCl is generated from numerous other manufacturing processes that involve processing or production of chlorinated compounds, such as vinyl chloride monomer (VCM) and toluene diisocyanate (TDI), among others. Several TDI plants worldwide practice a Bayer-Hoechst-Uhde HCl electrolysis process for converting aqueous HCl to $Cl_2$ and $H_2$. The AHCl is prepared for electrolysis by absorption initially in water which becomes a dilute hydrochloric acid. This absorption process serves a dual purpose as it allows inerts, such as $N_2$, CO, etc., to be removed from the process. Acid products from the absorption system are fed to electrolytic cells where a portion of the HCl is removed from the acid stream according to the reaction:

$$2HCl \xrightarrow{\text{Electrolysis}} Cl_2 + H_2$$

Dilute acid exiting the cells is circulated back to the adsorption system for reconcentration. The product gases, $H_2$ and $Cl_2$, exit the cells as separate streams and are fed to the cleanup systems. Product quality after treatment (for dry gas) of $Cl_2$ is about 99.5% volume with about 5000 ppm (% volume) $H_2$ contaminant as described by the Hoechst-Uhde brochure, "Chlorine and Hydrogen from Hydrochloric Acid by Electrolysis" (B&K XV 1000, 1/87).

Noble gases, namely, argon (Ar), helium (He), krypton (Kr), neon (Ne) and xenon (Xe) being inert are normally used as plasma generating gases or ionizing gases and/or quench gases in plasma-chemical processes involving hydrogen. Argon is the most commonly used noble gas due to its availability and lower cost compared to other noble gases. In plasma-chemical processes, Ar is recovered and recycled. It normally contains $H_2$ contaminants in several thousand ppm (% wt.). One example is described in U.S. Pat. No. 5,211,923; hydrogen and sulfur recovery from hydrogen sulfide wastes using Ar as a plasma gas. The reaction gases, including Ar. $H_2$, and S, among others, exit the plasma reactor at a temperature in the range of about 150–450° C. and at a pressure in the range of about 0.5–2.0 atm.

Hydrogen cyanide (HCN) is typically produced commercially by two methods, the Andrussow process and Degussa process. The major difference between the two processes is that the Andrussow process is carried out in the presence of air whereas the Degussa Process is performed in the absence of air.

The synthesis of HCN by the Andrussow Process can be described by the following overall reaction:

$$CH_4+NH_3+3/2O_2 \rightarrow HCN+3H_2O$$

Although the stoichiometric reaction between ammonia and methane produces only HCN and water, a number of side reactions lead to the generation of undesired by-products including nitrogen, hydrogen, carbon monoxide, and carbon dioxide. Typical effluent gas compositions produced by the Andrussow process are characterized in wt. % as:

| | |
|---|---|
| HCN | 7.6% |
| $CH_4$ | 0.3% |
| $NH_3$ | 0.6% |
| CO | 3.9% |
| $CO_2$ | 0.3% |
| $H_2O$ | 23.5% |
| $H_2$ | 13.3% |
| $N_2$ | 50.5% |

The main reaction for the production of HCN in the Degussa process is:

$$CH_4+NH_3 \rightarrow HCN+3H_2$$

In addition to the main reaction, partial decomposition of ammonia also takes place according to the formula:

$$NH_3 \rightarrow 1/2\ N_2 + 3/2 H_2$$

Ammonia and methane are fed in a 1:1 molar ratio at a short residence time. The conversion of methane and ammonia is greater than 99 mole % with a selectivity of 90 mole % of HCN. Since the Degussa process is performed in the absence of air, the number of undesired waste gases are less than those generated by the Andrussow process. Typical effluent gas compositions produced by the Degussa process are characterized in wt. % as:

| | |
|---|---|
| $NH_3$ | 1.3% |
| $CH_4$ | 3.6% |
| HCN | 22.0% |
| $H_2$ | 71.2% |
| $N_2$ | 1.9%. |

In these and other gaseous process streams, one general procedure that could be used to separate and selectively remove hydrogen from other gases in a hydrogen-containing process stream would be to pass the gases over or through a bed of the above-described Cd containing zeolite, silica, alumina, carbon or clay compositions at a temperature tat would ultimately allow encapsulation of the $H_2$ on or within the compositions but would minimize the encapsulation of the other gases present. This temperature is typically at least about 20° C. but less than about 500° C. However, it is anticipated and should be understood that room temperature (~20° C.) and lower temperatures (below 0° C.) could be utilized with a corresponding increase in pressure.

The hydrogen can thereafter be released (i.e., reversible storage) from the Cd containing zeolite, silica, alumina, carbon or clay compositions by heating the compositions to higher temperatures and/or by reducing the surrounding pressure. Typically, this is a temperature greater than about 100° C., although it is dependent, among other things, on the temperature of encapsulation.

As noted above, encapsulation of hydrogen can take place in large amounts without having to go up to high pressures which are necessary in the prior art. Pressures from about 900 atm (9.09 MPa) all the way down to 1 atmosphere (0.101 MPA) can be conveniently used for encapsulation. Preferably, pressures less than 100 (10.1 MPa), or more preferably, less than 50 atm (5.05 MPa), are utilized. Subsequent controlled release of hydrogen from the inventive compositions (i.e., reversible storage) can be accomplished by a decapsulation process which is fundamentally simple and does not require high temperatures as is usually the case with metal hydrides. As noted above, this can be accomplished by heating the hydrogen-encapsulated zeolite, silica, alumina, carbon or clay compositions to slightly higher temperatures and/or by reducing the surrounding pressure.

Various terms may be used to describe the encapsulation process, which is used to define the reversible process of penetration by, or containment or entrapment of, hydrogen on the surface of a Cd containing zeolite, silica, alumina, carbon or clay or in the Cd containing zeolite, silica, alumina, carbon or clay pores, also referred to as cages or channels. Thus, the terms "encapsulation" or "encapsulated" as used herein are meant to include, but not be limited to, binding, chemisorption, physisorption, entrapment, occlusion, imbibation, intercalation, persorption, sorption, adsorption, and absorption.

Another possible non-limiting application for the above-defined Cd containing zeolite, silica, alumina, carbon or clay compositions involves the storage of hydrogen, which is a potential renewable fuel source. Before it can be effectively utilized as a fuel in car engines or other power producing devices, a safe and convenient storage method needs to be developed that can store large amounts of hydrogen gas and easily release it at a consistent rate. The above-described compositions may be very useful in exactly such a storage application when placed in contact with hydrogen

EXAMPLES

The following non-limiting examples and comparative examples further illustrate the invention. All percentages are by weight unless otherwise stated.

Comparative Example 1

Blank Column

An empty gas chromatographic column was loaded into a HP 5990 GC (gas chromotograph). 100 μL samples of $H_2$ were injected into the GC using a nitrogen carrier stream at temperatures between 50° C. and 350° C. The changes in peak intensity with column temperature are shown in Table 1.

Comparative Example 2

Na-rho Zeolite

The staring Na/Cs-rho material was prepared using a procedure described in U.S. Pat. No. 3,904,738. 100 g of Na,Cs-rho was ion exchanged six times with 1000 mL of a 10% $NaNO_3$ solution at 90° C. for 1 hour each time. Separation of solids and liquids between exchanges was achieved by centrifugation The final form of the zeolite had the formula $Na_{7.5}Cs_{2.4}Si_{36.6}Al_{11.4}O_{96}$ as determined by ICP.

Before evaluation, the sample was granulated to 20/30 mesh. A gas chromatographic column was loaded with 1.95 g of Na-rho zeolite. It was then placed in a vertically mounted tube furnace and heated to 500° C. for 10 hrs. under nitrogen/vacuum.

100 μL samples of $H_2$ were injected into a HP 5990 GC using a nitrogen carrier stream at temperatures between 50° C. and 350° C. The changes in peak intensity with column temperature are shown in Table 1.

Prior Art Example 3

Cd-Rho Zeolite

The stating Na/Cs-rho material was prepared using a procedure described in U.S. Pat No. 3,904.738 15 g of Na,Cs-rho was ion exchanged eight times with 150 mL of a 10% $NH_4NO_3$ solution at 90° C. for 1 hour each time. The resultant $NH_4$-rho was further ion exchanged eight times with a 10% $NaNO_3$ solution at 90° C. for 1 hour each time. The Na-rho obtained was ion exchanged eight times with a 10% $Cd(NO_3)_2$ solution at 90° C. for 1 hour each time. Separation of solids and liquids between exchanges was achieved by centrifugation. The final form of the zeolite had the formula $Na_{0.47}Cs_{0.1}Cd_{2.0}Si_{36}Al_{12}O_{96}$ as determined by ICP.

Before evaluation, the sample was granulated to 20/30 mesh. A gas chromatographic column was loaded with 1.44 g of Cd-rho zeolite. It was then placed in a vertically mounted tube furnace and heated to 500° C. for 10 hrs. under nitrogen/vacuum.

100 μL samples of $H_2$ were injected into a HP 5990 GC using a nitrogen carrier stream at temperatures between 50°

C. and 350° C. The changes in peak intensity with column temperature shown in Table 1.

Prior Art Example 4

Cd-rho Zeolite

The starting Na/Cs-rho material was prepared using a procedure described in U.S. Pat. No. 3,904,738. Na,Cs-rho was ion exchanged eight times with a 10% $NH_4NO_3$ solution at 90° C. for 1 hour each time. 4 g of the resultant $NH_4$-rho was further ion exchanged three times with a 10% cadmium acetate solution at 90° C. for 1 hour each time. Separation of solids and liquids between exchanges was achieved by centrifugation. The final form of the zeolite had the formula $Cs_{0.1}Cd_{4.3}Si_{35.6}Al_{11.4}O_{96}$ as determined by ICP.

Before evaluation, the sample was granulated to 20/30 mesh. A gas chromatographic column was loaded with 1.4 g of Cd-rho zeolite. It was then placed in a vertically mounted tube furnace and heated to 500° C. for 10 hrs. under nitrogen/vacuum.

100 $\mu$L samples of $H_2$ were injected into a HP 5990 GC using a nitrogen carrier stream at temperatures between 50° C. and 350° C. The changes in peak intensity with column temperature shown in Table 1.

Comparative Example 5

NaA Zeolite

A gas chromatographic column was loaded with Davison Grade 514 4A Beads. The column was then placed in a vertically mounted tube furnace and heated to 500° C. for 10 h under nitrogen/vacuum. 100 $\mu$L samples of $H_2$ were injected into a HP 5990 GC using a nitrogen carrier stream at temperatures between 50° C. and 350° C. The changes in peak intensity with column temperature are shown in Table 1.

Example 6

Cd-A Zeolite

Zeolite 4A (Alfa Inorganics, Lot B12G) was ion-exchanged three times with 300 mL of a 10% $Cd(NO_3)_2$ solution at 90° C. for 1 hour each time. Separation of solids and liquids between exchanges was achieved by centrifugation. The final form of zeolite had the formula $Na_{0.52}Cd_{6.1}Si_{11.6}Al_{12.4}O_{48}$ as determined by ICP.

Before evaluation, the sample was granulated to 20/30 mesh. A gas chromatographic column was loaded with 2.68 g of Cd-A zeolite. It was then placed in a vertically mounted tube furnace and heated to 500° C. for 10 hrs. under nitrogen/vacuum.

100 $\mu$L samples of $H_2$ were injected into a HP 5990 GC using a nitrogen carrier stream at between 50° C. and 350° C. The changes in peak intensity with column am shown in Table 1.

Example 7

Cd-X Zeolite

Zeolite 13X (Alfa Inorganics, Lot 072182) was ion-exchanged three times with 300 mL of a 10% $Cd(NO_3)_2$ solution at 90° C. for 1 hour each time. Separation of solids and liquids between exchanges was achieved by centrifugation. The final form of zeolite had the formula $Na_{2.4}Cd_{4.3}Si_{101}Al_{91}O_{384}$ as determined by ICP.

Before evaluation, the sample was granulated to 20/30 mesh. A gas chromatographic column was loaded with 2.19 g of Cd-X zeolite. It was then placed in a vertically mounted tube furnace and heated to 500° C. for 10 hrs. under nitrogen/vacuum 100 $\mu$L samples of $H_2$ were injected into a HP 5990 GC using a nitrogen carrier steam at temperatures between 50° C. and 350° C. The changes in peak intensity with column temperature are shown in Table 1.

Example 8

Cd-Y Zeolite

Zeolite NaY (Alfa Inorganics, Lot L21G) was ion-exchanged three times with 300 mL of a 10% $Cd(NO_3)_2$ solution at 90° C. for 1 hour each time. Separation of solids and liquids between exchanges was achieved by centrifugation. The final form of zeolite had the formula $Na_{11.2}Cd_{20.8}Si_{133}Al_{59}O_{384}$ as determined by ICP.

Before evaluation, the sample was granulated to 20/30 mesh A gas chromatographic column was loaded with 1.83 g of Cd-Y zeolite. It was then placed in a vertically mounted tube furnace and heated to 500° C. for 10 hrs. under nitrogen/vacuum.

100 $\mu$L samples of $H_2$ were injected into a HP 5990 GC using a nitrogen carrier stream at temperatures between 50° C. and 350° C. The changes in peak intensity with column temperature are shown in Table 1.

Example 9

Cd-ZK-5 Zeolite

Zeolite KCs-ZK-5 was prepared by literature methods (Robson, U.S. Pat. No. 3,720,753). A 15 g sample was ion-exchanged three times with 150 mL of a 10% $Cd(NO_3)_2$ solution at 90° C. for 1 hour each time. Separation of solids and liquids between exchanges was achieved by centrifugation. The final form of zeolite had the formula $Na_{0.1}K_{11.3}Cd_{4.4}Si_{73.4}Al_{22.6}O_{192}$ as determined by ICP.

Before evaluation, the sample was granulated to 20/30 mesh. A gas chromatographic column was loaded with 1.68 g of Cd-ZK-5 zeolite. It was then placed in a vertically mounted tube furnace and heated to 500° C. for 10 hrs. under nitrogen/vacuum.

100 t samples of $H_2$ were injected into a HP 5990 GC using a nitrogen carrier stream at temperatures between 50° C. and 350° C. The changes in peak intensity with column temperature are shown in Table 1.

Example 10

Cd-ZSM-5, Zeolite

A 15 g sample of Na-ZSM-5 (Zeocat PZ-2/50 Na) was ion-exchanged three times with 150 mL of a 10% $Cd(NO_3)_2$ solution at 90° C. for 1 hour each time. Separation of solids and liquids between exchanges was achieved by centrifugation. The final form of zeolite had the formula $Na_{0.19}Cd_{0.92}Si_{92.2}Al_{3.8}O_{192}$ as determined by ICP.

Before evaluation, the sample was granulated to 20/30 mesh. A gas chromatographic column was loaded with 1.48 g of Cd-ZSM-5 zeolite. It was then placed in a vertically mounted tube furnace and heated to 500° C. for 10 hrs. under nitrogen/vacuum.

100 $\mu$L samples of $H_2$ were injected into a HP 5990 GC using a nitrogen carrier stream at temperatures between 5°

C. and 350° C. The changes in peak intensity with column temperature are shown in Table 1.

Example 11

Cd-Mordenite Zeolite

A 15 g sample of Na-Mordenite (Zeocat FM-8/Na) was ion-exchanged three times with 150 mL of a 10% $Cd(NO_3)_2$ solution at 90° C. for 1 hour each time. Separation of solids and liquids between exchanges was achieved by centrifugation. The final form of zeolite had he formula $Na_{1.9}Cd_{2.4}Si_{41.0}Al_{7.0}O_{96}$ as determined by ICP.

Before evaluation, the sample was granulated to 20/30 mesh. A gas chromatographic column was loaded with 1.87 g of Cd-Mordenite zeolite. It was then placed in a vertically mounted tube furnace and heated to 500° C. for 10 hrs. under nitrogen/vacuum.

100 μL samples of $H_2$ were injected into a HP 5990 GC using a nitrogen carrier stream at temperatures between 50° C. and 350° C. The changes in peak intensity with column temperature are shown in Table 1.

These data show the ability of the Cd containing zeolite compounds to strongly and reversibly absorb hydrogen, indicated by the loss of intensity of the hydrogen peak at high temperatures.

manifold was pumped out. Using the integration portion of the software package, the total hydrogen signal was $2.55 \times 10^{-6}$ amp-seconds Several different pressures were used to construct a linear calibration plot of filled manifold pressure, P, versus integrated MS signal area, A. The calibration line was:

$$A = 5.32 \times 10^{-2} + 0.3445 \times P$$

where P is Torr (0.133 MPa) and A is amp-sec for the 11.067 mL volume at 304° K (30.85° C.). The equation:

$$n = 1696 \times A - 8.9 \times 10^{-8}$$

was used to yield the number of moles, n, of hydrogen measured by the MS where A is the integrated area of the hydrogen signal (amp-sec) (assuming ideal gas behavior where 1 mole of hydrogen occupies 22.4 Liters at S.T.P., 0° C. (273.2K) and 760 Torr (101 MPa), the above calibration in pressure.)

Example 12

Cd-Mordenite: First Hydrogen Exposure at 200° C.

A 0.2684 g sample of the Cd-exchanged Mordenite from Example 11 was heated at 10° C./minute under vacuum from room temperature to 400° C. and kept at 400° C. for 30

TABLE 1

| Gas flow: He, TCD: 42.7 sccm $(7.12 \times 10{-8}\ m^3/s)$; Col: 6.0 sccm $(1.00 \times 10{-8}\ m^3/s)$ | | | | | | | | | |
|---|---|---|---|---|---|---|---|---|---|
| Ex. | −50° C. | 50° C. | 100° C. | 150° C. | 200° C. | 250° C. | 300° C. | 350° C. | 400° C. | 450° C. |
| 1 | 10218 | 10367 | | | 10717 | | | 8639 | | 5367 |
| 2 | | 7929 | | | 7614 | | | 5835 | | 1426 |
| 3 | | 6636 | 5096 | 702 | 0 | | | 0 | | |
| 4 | | 9358 | 7580 | 3537 | 0 | 0 | 0 | 0 | 0 | |
| 5 | | 8852 | | | 8807 | | | 6426 | | 2867 |
| 6 | | 6003 | | | 6381 | 5715 | 4032 | 136 | | 0 |
| 7 | | 9388 | | | 7213 | 3794 | 1257 | 0 | | |
| 8 | | 9198 | | 7016 | 2102 | 120 | | 0 | | |
| 9 | | 7494 | 7117 | 5351 | 198 | | | 0 | | |
| 10 | | 5155 | 4729 | 2306 | 0 | | | 0 | | |
| 11 | | 3490 | | | 0 | | | | | |

Instrumentation and Calibration of the Mass Spectrometer for Hydrogen Quantification The adsorption instrument was an RXM-100 manufactured by Advanced Scientific Designs, Inc. (ASDI) of Grosse Pointe Park, Mich. Built into the instrument is a Mass Spectrometer (MS), Model 100C, made by UTI Instruments. Software provided with the RXM drives the MS allowing a specific mass signal to be monitored as a function of time.

The volume of the gas manifold was calibrated to be 11.067 mL; the temperature of the manifold was held constant at 304° K (29.85° C.). The manifold was equipped with a capacitance manometer to measure pressure from 1 milliTorr to 1000 Torr (0.0001–133.3 MPa). The manifold volume was filled with high purity hydrogen to a pressure of 7.137 Torr (0.95 MPa). The MS and tubing to the gas manifold was pumped out using a turbomolecular vacuum pump to a pressure below $10^{-7}$ Torr ($133 \times 10^{-9}$ MPa) with the MS turned on. The ITA software program on the RXM-100 was used to track the hydrogen signal versus time. The valve from the manifold to the MS was slowly opened and the hydrogen MS signal recorded as the pressure in the minutes before cooling to 200° C. At 200° C., the gas manifold was used to dose helium gas to the sample volume to obtain the sample Free Space and "Helium Expansion Ratio". After this measurement, the sample was evacuated and the gas manifold was used to dose hydrogen to the sample via standard volumetric techniques to develop a "Total Adsorption" Isotherm. This isotherm is a plot, at constant temperature, of the amount of gas adsorbed as a function of the final equilibrium pressure after each dose. After this isotherm was obtained, the sample was evacuated; the ionization gauge read $2.3 \times 10^{-6}$ Torr (0.3 MPa). A second isotherm, "the Physical Adsorption" Isotherm, was then obtained in a like manner.

Subtraction of the second isotherm from the first yields the Chemisorption curve; by convention, a straight line fit is used to extrapolate the higher values to the Y-axis and the intercept is reported as the amount of gas chemisorbed, mL/g. The unit, mL, is the volume of gas adsorbed at S.T.P. Until the dry weight of the sample is obtained, its wet weight was used for the measurement. The amount of chemisorbed hydrogen was measured as 4.9 mL/g (a sample weight of 0.25 g was used until a dry weight was determined). After the measurement, the sample was evacuated and the off-gas was examined by MS. Hydrogen came off immediately but after several minutes of pumping there was an increase in the amount of water being desorbed from the sample. After evacuating the sample at 200° C. overnight, the sample, still being evacuated, was raised to 400° C. at a ramp rate of 10° C. per minute where it was held for an additional 30 minutes. During the heating, TPC-MS (temperature programmed chemistry—mass spectrometry) analysis of the off-gas was performed Both water (mass 18) and hydrogen (mass 2) were the largest components desorbing from the sample during this operation.

The number of moles of hydrogen that was chemisorbed was $5.47 \times 10^{-5}$ which was calculated using a sample weight of 0.25 g to give the number of mL of hydrogen adsorbed and dividing that by 22,400 as the mL/mole. The integrated area of the TPC-MS run was between $2.35–3.21 \times 10^{-6}$ amp-s corresponding to $4.0–5.44 \times 10^{-6}$ moles of hydrogen passing into the MS. These values correspond to 7.4 to 10% recovery of the hydrogen chemisorbed.

Example 13

Cd-Mordenite: Second Hydrogen Exposure at 200° C.

The sample from Example 12 was cooled, under vacuum to 200° C. The chemisorbed amount of hydrogen was measured as in Example 11 to be 2.72 mL/g. After the chemisorption experiment, a TPC-MS was run as the sample was heated, under evacuation, to 400° C. Compared to Example 11 where the water MS signal was greater than the one for hydrogen, the signal for hydrogen was larger than that of water until the temperature of 400° C. was reached.

The number of moles of hydrogen that was chemisorbed was $3.04 \times 10^{-5}$ calculated as in Example 11. The integrated area of the TPC-MS run was between $1.61–1.76 \times 10^{-5}$ amp-s corresponding to $2.73–2.98 \times 10^{-5}$ moles of hydrogen passing into the MS. These values correspond to 90 to 98% recovery of the hydrogen chemisorbed.

Example 14

Cd-Mordenite: Third Hydrogen Exposure at 200° C.

The sample from Example 13 was cooled under vacuum to 200° C. The chemisorbed amount of hydrogen was measured as in Example 11 to be 2.40 mL/g. A TPC-MS was run as the sample was heated, under evacuation, to 400° C. The MS signal for hydrogen was larger than that of water for the entire run.

The number of moles of hydrogen that was chemisorbed was $2.68 \times 10^{-5}$ calculated as in Example 11. The integrated area of the TPC-MS run was between $0.863–0.963 \times 10^{-5}$ amp-s corresponding to $1.46–1.63 \times 10^{-5}$ moles of hydrogen passing into the MS. These values correspond to 55 to 61% recovery of the hydrogen chemisorbed.

Example 15

Cd-Mordenite: Hydrogen Exposure at 100° C.

After the TPC-MS run of Example 14, the sample was cooled to 100° C. and the chemisorbed amount measured, a value of 2.22 mL/g was obtained corresponding to $2.48 \times 10^{-5}$ moles of hydrogen adsorbed. The integrated area for the TPC-MS run was between 1.20 to $1.33 \times 10^{-5}$ amp-s corresponding to 2.04 to $2.26 \times 10^{-5}$ moles of hydrogen passing into the MS. These values correspond to 82 to 91% recovery of the hydrogen chemisorbed.

Example 16

Cd-Mordenite: First Hydrogen Exposure at 60° C.

After the TPC-MS run of Example 15, the sample was cooled to 60° C. and the chemisorbed amount measured; a value of 1.45 mL/g was obtained corresponding to $1.62 \times 10^{-5}$ moles of hydrogen adsorbed. Unlike the previous TPC-MS runs, two peaks were observed in the hydrogen desorption (TPC 080196 E89967-25); a sharp peak centered at 145*° C. and a broad peak between 280 and 400° C. The total integrated area for the two TPC-MS i was between 0.877 to $1.12 \times 10^{-5}$ amp-s corresponding to 1.49 to $1.90 \times 10^{-5}$ moles of hydrogen passing into the MS. These values correspond to 92 to 100% recovery of the hydrogen chemisorbed. The 145° C. peak represents 8 to 10% of the total amount of hydrogen recovered.

Example 17

Cd-Mordenite: Second Hydrogen Exposure at 60° C.

After the TPC-MS run of Example 16, the sample was cooled to 60° C. and the chemisorbed amount measured; a value of 1.53 mL/g was obtained corresponding to $1.71 \times 10^{-5}$ moles of hydrogen adsorbed. As in Example 15, two peaks were observed in the TPC-MS race run. The integrated area for the two peaks was between 0.805 to $0.950 \times 10^{-5}$ amp-s corresponding to 1.37 to $1.61 \times 10^{-5}$ moles of hydrogen passing into the MS. These values correspond to 80 to 94% recovery of the hydrogen chemisorbed. The low temperature peak represents 17 to 18% of the total amount of hydrogen recovered. The sample was then cooled to room temperature under vacuum and back-filled with nitrogen. The dry weight of the Cd-Mordenite was measured as 0.2358 g.

Corrected values of $H_2$ adsorbed per gram (dry weight basis) are shown in for examples 12–17.

TABLE 2

| | | Cd-Mordenite | | | | |
|---|---|---|---|---|---|---|
| Example | ° C. | $\mu$moles $H_2$ Chemi-sorbed | $\mu$moles/ g $H_2$ Chemi-sorbed | $\mu$moles $H_2$ Desorbed | $\mu$moles/ g $H_2$ Desorbed | % $H_2$ Recovered |
| 12 | 200 | 54.7 | 232 | 4.0–5.4 | 17–23 | 7–10 |
| 13 | 200 | 30.4 | 129 | 27–30 | 114–127 | 90–98 |
| 14 | 200 | 26.8 | 114 | 15–16 | 62–69 | 55–61 |
| 15 | 100 | 24.8 | 105 | 20–23 | 86–96 | 82–91 |
| 16 | 60 | 16.2 | 69 | 15–19 | 63–80 | 92–100 |
| 17 | 60 | 17.1 | 75 | 14–16 | 58–68 | 80–94 |

Example 18

Cd-Mordenite: New Sample at 60° C., <1 atm (0.101 MPa)

Cd-exchanged mordenite was prepared similarly to Example 11, except that 1/16 inch (0.16 cm) Na mordenite (zeolon 900) was used (final analysis was $Na_{1.9}Cd_{2.1}Si_{40.9}Al_{7.1}O_{96}$). A 0.2440 g sample was heated at 10° C./minute under vacuum from room temperature to 400° C. and kept at 400° C. for 60 minutes before cooling to 60° C. A value of 0.86 cc or $3.84 \times 10^{-5}$ moles of hydrogen was chemisorbed. Two peaks were observed in the TPC-MS trace run. The integrated area for the two peaks was between 0.647 to 0.761×10$^{-5}$ amp-s corresponding to 1.10 to 1.29× 10$^{-5}$ moles of hydrogen passing into the MS. These desorption values correspond to 29 to 34% recovery of the hydrogen chemisorbed. The low temperature peak represents about 5% of the total amount of hydrogen recovered.

Example 19

Cd-Mordenite: 2nd Hydrogen Exposure at 60° C., <2.5 atm (0.253 MPa)

After the TPC-MS ran of Example 18, the sample was cooled to 60° C. and the chemisorbed amount measured using higher pressures than for Examples 16 and 17; a value of 0.40 mL was obtained corresponding to 1.79×10$^{-5}$ moles of hydrogen adsorbed. The chemisorbed amount seemed to saturate to the value reported while the physisorbed amount increased directly with pressure. The integrated area for the peaks corresponds to 1.16 to 1.36×10$^{-5}$ moles of hydrogen passing into the MS. These values correspond to 65 to 76% recovery of the hydrogen chemisorbed. The low temperature peak represents about 12% of the total amount of hydrogen recovered.

From this example, it appears that there are two different uses for this or similar materials. They can be used to separate hydrogen from a non-adsorbing gas via pressure-swing adsorption system using the physical adsorption effect. At high pressure, the hydrogen would be adsorbed and, when the pressure was reduced, the purified hydrogen could be recovered. These operations could be performed at reasonable temperatures so that costly low-temperature (sub-ambient) adsorptions would not be needed. The second use could be as a selective adsorbent to remove small amounts of hydrogen from a process stream where the hydrogen would be in the chemisorbed state. This hydrogen could be recovered only by subsequently heating the material.

Example 20

Cd-Mordenite: Hydrogen exposure at 30° C., <2.5 atm (0.253 MPa)

After the TPC-MS run of Example 19, the sample was cooled to 30° C. and the chemisorbed amount measured using pressures similar to Example 20, values in the range corresponding to 0.32 to 0.54×10$^{-5}$ moles of hydrogen were measured. Because of the high range of the pressure gauge, the pressure is not measured accurately causing large error in the amounts adsorbed. The TPC-MS trace was similar to those for Examples 16 and 17. The integrated area for the peaks corresponds to 0.68 to 0.82×10$^{-5}$ moles of hydrogen passing into the MS. These values correspond to more than the hydrogen chemisorbed probably in error because of the stated low accuracy of the gauge). The low temperature peak represents about 38% of the total amount of hydrogen recovered.

Example 21

Cd-Mordenite. Hydrogen Exposure at 30° C., <1 atm (0.101 MPa)

After the TPC-MS run of Example 20, the sample was cooled to 30° C. and the chemisorbed amount measured using pressures similar to Example 18. A value between 0.24 to 0.29×10$^{-5}$ moles of hydrogen was measured; the exact value is in doubt because the chemisorbed amount didn't reach a constant value so that extrapolation back to the origin was not exact The TPC-MS trace showed two peaks. The total integrated area for the peaks corresponds to 0.393×10$^{-5}$ moles of hydrogen passing into the MS which corresponds to more than the hydrogen chemisorbed. The low temperature peak (132° C.) represents about 16% of the total amount of hydrogen recovered.

Example 22

Cd-Mordenite: Hydrogen Exposure at 30° C., <2.5 atm (0.253 MPa)

After the TPC-MS run of Example 21, the sample was cooled to 30° C. and the chemisorbed amount measured using pressures to 2.5 atm (0.253 MPa); a value of 8.4×10$^{-6}$ moles was obtained. The TPC-MS trace showed two peaks; the first peak at 132° C. comprised 29% of the total of 8.95×10$^{-6}$ moles evolved.

Example 23

Cd-Mordenite: Hydrogen Exposure at 30° C., <1 atm (0.101 MPa)

After the TPC-MS run of Example 22, the sample was cooled to 30° C. and the chemisorbed amount measured using pressures to 1 atm (0.101 MPa). In this case, the first adsorption was performed with $H_2$, the sample was evacuated, and the second adsorption isotherm was obtained using $D_2$—a chemisorption value of 7.14×10$^{-6}$ moles was obtained. For the TPC-MS trace, masses 2, 3 and 4 were followed corresponding to $H_2$, HD, and $D_2$. It was assumed that the MS calibration for HD and $D_2$ were similar to that for $H_2$. The $H_2$ trace showed 2 peaks; the first peak at 126° C. comprised 40% of the total of 2.95×10$^{-6}$ moles evolved. The HD trace showed 2 peaks; the first at 120° C. comprised 89% of the total of 6.0×10$^{-7}$ moles. The $D_2$ trace continued the trend and the high temperature peak was absent; the single peak, at 117° C., corresponds to 1.0×10$^{-7}$ moles. The total moles of hydrogen isotopes released during TPD was 3.65×10$^{-6}$.

After his run, the sample was cooled to room temperature under vacuum and back-filled with nitrogen. The dry weight of the Cd-Mordenite was measured as 0.2178 g. Corrected values of $H_2$ adsorbed per gram (dry weight basis) are shown in Table 3 for examples 18–23.

TABLE 3

| | Cd-Mordenite | | | | |
|---|---|---|---|---|---|
| Example | ° C. | µmoles $H_2$ Chemi-sorbed | µmoles/ g $H_2$ Chemi-sorbed | µmoles $H_2$ Desorbed | µmoles/ g $H_2$ Desorbed | % $H_2$ Recovered |
| 18 | 60 | 38.4 | 176 | 11–12.9 | 50–59 | 29–34 |
| 19 | 60 | 17.9 | 82 | 11.6–13.6 | 53–62 | 65–76 |
| 20 | 30 | 3.2–5.4 | 15–25 | 6.8–8.2 | 31–38 | 100 |
| 21 | 30 | 2.4–2.9 | 11–13 | 3.93 | 18 | 100 |
| 22 | 30 | 8.4 | 39 | 8.95 | 41 | 100 |
| 23 | 30 | 7.14 | 33 | 3.65 | 17 | 51 |

Example 24

25 g of zeolite A (Division 4A grade 514 beads) was exchanged three times with 250 mL of a 10% Cd $(NO_3)_2$ solution at 90° C. for 1 hr. each time. The unit cell composition was determined to be $Na_{0.4} Cd_{5.25} Si_{13.4} Al_{10.6} O_{48}$. A 0.2681 g sample (Cd-A) was heated at 10° C./minute under vacuum from room temperature to 400° C. and kept at 400° C. for 60 minutes before cooling to 60° C. At 60° C., between 0.18 to 0.23 cc of $H_2$ were chemisorbed corresponding to 0.80 to $1.03\times10^{-5}$ moles of $H_2$. The sample was then heated to 400° C. under vacuum following the normal protocol for TPD-MS. The TPD-MS trace showed two peaks, at 130 and 170° C. with a total area of $8.87\times10^{-6}$ amp-s corresponding to a total of $1.5\times10^{-5}$ moles of $H_2$. Very little $H_2$ came off above 220° C.

Example 25

Cd-A: 2nd Hydrogen Exposure at 60° C., <2.5 atm

After the TPD-MS of Example 24, the sample was cooled to 60° C. and the adsorption of $H_2$ was measured. The amount chemisorbed ranged from 0.16 to (0.71 to $1.70\times10^{-5}$ moles). The TPD-MS trace showed a peek at 120° C. with a small shoulder in the 160–200° C. range. The peak at 170° C. had virtually disappeared. The area of $1.21\times10^5$ corresponds to $2.05\times10^{-5}$ moles of $H_2$ desorbed. Further, the trace for $H_2O$ was signficantly reduced from Example 24.

Example 26

Cd-A: 1st Hydrogen Exposure at 30° C., <2.5 atm (0.253 MPa)

After the TPD-MS of Example 25, the sample was cooled to 30° C. and the adsorption of $H_2$ was measured. There was a jump in the adsorption values in the pressure interval 1.7–2 atm (0.172–0.202 MPa) from 0.1 to 1.07 cc (0.45 to 4.8× $10^{-5}$ moles). The TPD-MS trace was similar to Example 25 with an area of $1.28\times10^{-5}$ corresponding to 21.7 μmoles of $H_2$ desorbed. Again, the trace for $H_2O$ was significantly reduced.

Example 27

Cd-A: 2nd Hydrogen Exposure at 30° C., <1 atm (0.101 MPa)

After the TPD-MS of Example 26, the sample was cooled to 30° C. and the $H_2$ adsorption was measured as 0.04 cc (1.8 μmoles). The TPD-MS trace was similar to Example 25 with an area of $0.67\times10^{-5}$ corresponding to 11.3 μmoles of $H_2$ desorbed. Again, the trace for $H_2O$ was significantly reduced.

Example 28

Cd-A: 3rd Hydrogen Exposure at 30° C., <2.5 atm (0.253 MPa)

After the TPD-MS of Example 27, the sample was cooled to 30° C. and the $H_2$ adsorption was measured as 0.27 cc (12.1 μmoles). The TPD-MS trace was similar to Example 25 with an area of $0.94\times10^{-5}$ corresponding to 15.9 μmoles of $H_2$ desorbed. Again, the trace for $H_2O$ was significantly reduced.

Example 29

Cd-A: 4th $H_2$ Exposure at 30° C., <1 atm (0.101 MPa)

After the TPD-MS of Example 28, the sample was cooled to 30° C. and the $H_2/D_2$ chemisorption experiment was run similarly to Example 23 for Cd-Mordenite. The chemisorption measured amount was near 0 μmoles. The TPD-MS trace showed single peaks for the species $H_2$, HD and $D_2$. The $H_2$ peak (115° C.) had an area of 1.73 μamp-s; the HD peak (~118° C.) had an area of 2.94 μamp-s; the $D_2$ peak (120° C.) had an area of 1.8 μamps. The total peak area of 6.5 μamp-s corresponds to 11 μmoles of Hydrogen isotopes desorbed. Again, the trace for $H_2O$ was significantly reduced. After the measurement, the sample was backfilled with $N_2$ and its weight was 0.2216 g.

TABLE 4

Cd—A

| Example | ° C. | μmoles $H_2$ Chemisorbed | μmoles/ g $H_2$ Chemisorbed | μmoles $H_2$ Desorbed | μmoles/ g $H_2$ Desorbed | % $H_2$ Recovered |
|---|---|---|---|---|---|---|
| 24 | 60 | 8–10.3 | 36–46 | 15 | 68 | 100 |
| 25 | 60 | 7.1–17 | 32–77 | 20.5 | 93 | 100 |
| 26 | 30 | 4.5–47.8 | 20–215 | 21.7 | 98 | 50–100 |
| 27 | 30 | 1.8 | 8 | 11.3 | 51 | 100 |
| 28 | 30 | 12.1 | 55 | 15.9 | 72 | 100 |
| 29 | 30 | 0 | 0 | 11 | 50 | 100 |

Example 30

Cd-Y: 1st Hydrogen Exposure at 60° C., <1 atm

A 0.2118 g sample of Cd-exchanged zeolite Y from Example 8 (Cd-Y), was heated at 10° C./minute under vacuum from room temperature to 400° C. and kept at 400° C. for 60 minutes before cooling to 60° C. At 60° C., between 0.03 to 0.05 cc of $H_2$ were chemisorbed corresponding to 1.3 to 2.2 moles of H. The sample was then heated to 400° C. under vacuum following the normal protocol for TPD-MS. The TPD-MS trace showed two peaks, at 172 and 293° C. with a total $1.81\times10^{-6}$ amps corresponding to a total of 3.07 μmoles of $H_2$. The low temperature peak corresponded to 48% of the $H_2$ chemisorbed.

Example 31

Cd-Y: 2nd Hydrogen Exposure at 60° C., <1 atm

After the TPD of Example 30, the sample was cooled to 60° C. and a second chemisorption was run. At 60° C., 0.05 cc of $H_2$ were chemisorbed corresponding to 2.2 μmoles of $H_2$. The sample was backfilled with $N_2$ and weighed as 0.1624 g.

TABLE 5

Cd—Y

| Example | ° C. | μmoles $H_2$ Chemisorbed | μmoles/ g $H_2$ Chemisorbed | μmoles $H_2$ Desorbed | μmoles/ g $H_2$ Desorbed | % $H_2$ Recovered |
|---|---|---|---|---|---|---|
| 30 | 60 | 1.3–2.2 | 8–13.5 | 3.07 | 19 | 1.00 |
| 31 | 60 | 2.2 | 13.5 | | | |

Prior Art Example 32

Cd-Rho: 1st Hydrogen Exposure at 60° C., <1 atm

The starting Na/Cs zeolite rho was e using the procedure described in U.S. Pat. No. 3,904,738. This was then ion-exchanged six times with a 10% $NaNO_3$ solution, then six times with a 10% Cd $(NO_3)_2$ solution, each at 90° C. for 1 hr. The sample was then out-gassed on a vacuum line at 50° C. to ensure complete removal of moisture. A 0.2540 g sample was heated at 10° C./minute under vacuum from room temperature to 400° C. and kept at 400° C. for 60 minutes before cooling to 60° C. and running the chemisorption titration. At 60° C., there was a jump in the isotherm between 360 and 420 torr, between 0.12 to 0.36 cc of $H_2$ were chemisorbed corresponding to 5.4 to 16.1 μmoles of $H_2$. The sample was then heated to 400° C. under vacuum following the normal protocol for TPD-MS. The TPD-MS trace showed two peaks, at 165 and 400° C. with a total area of $3.29 \times 10^{-6}$ amp-s corresponding to a total of 6.0 μmoles of $H_2$. The low temperature peak corresponded to 15% of the $H_2$ chemisorbed.

Prior Art Example 33

Cd-Rho: 2nd Hydrogen Exposure at 60° C., <1 atm

After the TPD of Example 32, the sample was cooled to 60° C. and a second chemisorption was run. At 60° C., 0.29 cc of $H_2$ were chemisorbed corresponding to 12.9 μmoles of $H_2$. The sample was backfilled with $N_2$ and weighed as 0.2148 g.

TABLE 6

| | | Cd—Rho | | | |
|---|---|---|---|---|---|
| Example | °C. | μmoles $H_2$ Chemisorbed | μmoles/g $H_2$ Chemisorbed | μmoles $H_2$ Desorbed | μmoles/g $H_2$ Desorbed | % $H_2$ Recovered |
| 32 | 60 | 5.4–16.1 | 25–75 | 6.0 | 28 | 37–100 |
| 33 | 60 | 12.9 | 60 | | | |

Example 34

Cd-Silica: 1st Hydrogen Exposure at 30° C., <1 atm

A 0.2552 g sample of Cd-impregnated silica 1030E (Cd-CS), prepared as in Example 36 hereinafter, was heated at 10° C./minute under vacuum from room temperature to 400° C. and kept at 400° C. for 60 minutes before cooling to 30° C. and running the chemisorption titration. At 30° C., the total isotherm was obtained using $H_2$ while $D_2$ was used to obtain the physically adsorbed amount. The chemisorbed volume of 0.06 cc corresponds to 2.7 μmoles of Hydrogen isotopes. The sample was then heated to 400° C. under vacuum following the normal protocol for TPD-MS. The TPD-MS trace showed single peaks for each of the isotopes; the $H_2$ peak (at 143° C.) with an area of 0.28 μamp-s; the H/D peak (at 132° C.) with an area of 0.78 μamp-s; the $D_2$ peak (at 118° C.) with an area of 0.93 μamps. The total area of 2.0 μamp-s corresponds to a total of 3.4 μmoles of hydrogen isotopes.

Example 35

Cd-Silica: 2nd Hydrogen Exposure at 30° C., <1 atm

After the TPD of Example 34, the sample was cooled to 60° C. and a second chemisorption was run. At 60° C., 0.29 cc of $H_2$ were chemisorbed corresponding to 12.9 μmoles of $H_2$. The sample was backfilled with $N_2$ and weighed as 0.2148 g.

TABLE 7

| | | Cd-Silica | | | | |
|---|---|---|---|---|---|---|
| Example | °C. | μmoles $H_2$ Chemisorbed | μmoles/g $H_2$ Chemisorbed | μmoles $H_2$ Desorbed | μmoles/g $H_2$ Desorbed | % $H_2$ Recovered |
| 34 | 30 | 2.7 | | 3.4 | | 100 |
| 35 | 30 | 10 | | | | |

Examples 36–91 and Comparative Examples 92–95

Low Pressure Adsorption (<1 atm)

Materials were prepared as follows:

Cd-CS 10 grams of CS-1030E (lot number, 1592-13-4, ⅛" $SiO_2$ extrudates from PQ Corporation) were impregnated with 1 g of $Cd(NO_3)_2$ in 12 mL of $H_2O$. The dried material analyzed as containing 34.0% Si and 2.88% Cd.

Cd-X 25 grams of 13X beads (lot number 020278, –8/+12 beads from Alfa Inorganics) were exchanged with 250 mL of a 10% solution of $Cd(NO_3)_2$ at 90° C. for one hour. This was repeated for a total of 3 times. The beads were filtered, washed and dried. Chemical analysis indicated a unit cell composition of approximately $Si_{117.6}Al_{74.4}Na_{1.7}Cd_{39.8}O_{384}$, with O content assumed.

4A 4A sieve (lot number B12G from Alfa Inorganics) were granulated to –16/+30 mesh.

5A 5A sieve (lot number 012992 from Alfa Inorganics) were granulated to –20/+30 mesh.

Cd-ZSM-5

The material was prepared as in Example 10.

Cd-Rho

The material was prepared as in Prior Art Example 3.

10% Cd-A 25 g of 4A (Aldrich lot B12G) was exchanged with 250 mL of a 10% solution of $Cd(NO_3)_2$ at 90° C. for one hour. The material was then filtered, washed and dried. Chemical analysis indicated a unit cell composition of approximately $Si_{1.27}Al_{11.3}Na_{2.3}Cd_{5.0}O_{48}$, with O content assumed.

5% Cd-A 25 g of 4A (Aldrich lot B12G) was exchanged with 250 mL of a 5% solution of $Cd(NO_3)_2$ at 90° C. for one hour. The serial was then filtered, washed and dried. Chemical analysis indicated a unit cell composition of approximately $Si12.7Al_{11.3}Na_{5.4}Cd_{3.3}O_{48}$, with O content assumed.

Cs,Cd-A 10 g of Cd/4A beads (E75760103-2) was exchanged with 100 mL of a 10% solution of $Cs(NO_3)_2$ at 90° C. for 15 minutes. The beads were then filtered, washed and dried. Chemical analysis indicated a unit cell composition of approximately $Si_{12.7}Al_{11.3}Na_{5.4}Cd_{3.3}O_{48}$, with O content assumed.

Cs-A 100 g of 4A (Alfa lot 109G) was exchanged 3 times with 1200 mL of a 10% $CsNO_3$ solution at 90° C. for 1 h. The material was then filtered, washed and dried. Chemical analysis indicated a unit cell composition of approximately $Si_{12.0}Al_{12.0}Na_{6.8}Cs_{2.9}O_{48}$, with O content assumed.

Cd-Carbon 10 g of carbon (Engelhard lot 35758) was impregnated with 1 g of $Cd(NO_3)_2$ in 10 mL of $H_2O$ and dried.

Cd-ZK-5

The material was prepared as in Example 9.

Cd-Mordenite 30 g of mordenite (Chemie Uetikon, Zeocat FM-8/Na) was exchanged 3 times with 300 mL of a 10% solution of $Cd(NO_3)_2$. The material was then centrifuged, washed and dried 15 g of the resulting material was exchanged as above. Chemical analysis indicated a unit cell composition of approximately $Si_{41.5}Al6.5Na_{2.1}Cd_{2.5}O_{48}$, with O content assumed.

As indicated in the Tables, all examples were run under as low pressure adsorption (<1 atm) or high pressure adsorption (to 30–35 psi). For low pressure adsorption, the samples were heated at 10° C./minute under vacuum from room temperature to 400° C. and kept at 400° C. for 30 minutes before cooling to $T_a$, the adsorption temperature. Upon reaching the $T_a$, the gas manifold was used to dose helium gas to the sample volume to obtain the sample Free Space and "Helium Expansion Ratio". After this measurement, the sample was evacuated and the gas manifold used to dose hydrogen to the sample via standard volumetric techniques to develop a "Total Adsorption" Isotherm. This isotherm is a plot, at constant temperature, of the amount of gas adsorbed as a function of the equilibrium pressure after each dose. Dosing was continued in steps to a pressure <1 atm (0.101 MPa). After this isotherm is obtained, the sample is evacuated and a second isotherm, "Physical Adsorption" Isotherm, is obtained.

Subtraction of the second isotherm from the fist yields the Chemisorption curve; by convention, a straight line fit is used to extrapolate the higher values to the Y-axis and the intercept is reported as the amount of gas chemisorbed, mL, the volume of gas adsorbed at S.T.P. After the measurement, the sample was evacuated to remove all gases, and the off-gas examined by Mass Spectrometry, MS. While evacuating the sample, the temperature was raised at a ramp rate of 10° C./min. to 400° C. where it is held for an additional 30 minutes. During the heating, TPC-MS (Temperature Programmed Chemistry) analysis of the off-gas was performed. Both water (mass 18) and hydrogen isotopes (mass 2,3,4) were monitored. The integrated area of hydrogen isotopes was used (with a calibration curve) to give the number of moles of hydrogen passing through the MS. This value was compared to the Chemisorption value. After this cycle, the sample was cooled to $T_a$ and another experiment performed, if warranted. After the experiments were completed on a sample, the sample container is back-filled with nitrogen and a dry weight obtained.

The high pressure adsorption was run essentially the same as but the low pressure transducer, LPT, was valved off. The gas manifold and its pressure gauge, which is not as precise as the LPT, were used to develop the isotherms.

The results are shown in Tables 8–9. Where indicated in the remarks, a $H_2/D_2/HD$ adsorption was performed, similar to Example 23. These data show the ability of the Cd containing compounds to reversibly absorb hydrogen at amounts greater than compounds that do not contain Cd.

TABLE 8

EXAMPLES 36–90

| Ex. | Prep. Material | $T_a$ ° C. | Press. | Chemisorption μmoles | μmoles/g | Temp Prog Chem μmoles | μmoles/g | Dry Wt, g | % TPC/Chem | Remarks |
| --- | --- | --- | --- | --- | --- | --- | --- | --- | --- | --- |
| 36 | Cd-X | 30 | High | 6.00 | 27.4 | 16.00 | 73.1 | 0.2189 | 100 | $D_2$ peak at 115° C., HD at 126° C., $H_2$ at 136° C. |
| 40 | Cd-X | 30 | High | 9.30 | 42.5 | 12.50 | 57.1 | 0.2189 | 100 | $D_2$ peak at 92° C., HD at 112° C., $H_2$ at 126° C. |
| 41 | Cd-X | 30 | | 8.60 | 39.3 | | | 0.2189 | | Special run - held sample at 30° C., exposed to 499.81 Torr $H_2$ for 10 min. Final pressure 342.89 Torr (45.6 MPa). Pumped out and exposed to $D_2$ for physisorption. Pumped out and ramped to 400° C.. Adsorbed 65–100% in 10 min vs. Stepwise protocol. |

TABLE 8-continued

EXAMPLES 36–90

| Ex. | Prep. Material | $T_a$ °C. | Press. | Chemisorption | | Temp Prog Chem | | Dry Wt, g | % TPC/Chem | Remarks |
|---|---|---|---|---|---|---|---|---|---|---|
| | | | | µmoles | µmoles/g | µmoles | µmoles/g | | | |
| 42 | Cd-X | 30 | High | 13.20 | 60.3 | 11.00 | 50.3 | 0.2189 | 83 | $D_2$ peak at 100° C., HD at 105° C., $H_2$ at 130° C. |
| 43 | Cd-ZSM-5 | 30 | High | 0.49 | 1.5 | 0.66 | 2.0 | 0.3329 | 100 | $D_2$ peak at 151° C., HD at 159° C., $H_2$ at 174° C. |
| 44 | Cd-ZSM-5 | 30 | High | 0.36 | 1.1 | 0.63 | 1.9 | 0.3329 | 100 | $D_2$ peak at 128° C., HD at 145° C., $H_2$ at 168° C. |
| 45 | Cd-Carbon | 30 | High | 0.05 | 0.2 | 0.04 | 0.2 | 0.2072 | 86 | $H_2$ peak at 124° C.. |
| 46 | Cd-Carbon | 30 | High | 0.71 | 3.9 | 0.23 | 1.3 | 0.1833 | 32 | Thermal desorption to 300° C.; not 400° C. $H_2$ peak at 133° C. |
| 47 | Cd-Carbon | 30 | High | 0.31 | 1.7 | 0.19 | 1.0 | 0.1833 | 61 | Similar to 46 |
| 48 | Cd-Carbon | 30 | High | 0.09 | 0.4 | 0.10 | 0.5 | 0.2071 | 100 | Thermal desorption to 300° C.; not 400° C. |
| 49 | Cd-Carbon | 30 | High | 0.05 | 0.2 | 0.05 | 0.2 | 0.2071 | 100 | Similar to 48 |
| 50 | Cd-Rho | 30 | High | 0.31 | 1.5 | 0.15 | 0.7 | 0.2020 | 48 | $D_2$ peak at 118° C., HD at 124° C., $H_2$ at 132° C. |
| 51 | Cd-Rho | 30 | High | 0.13 | 0.6 | 0.22 | 1.1 | 0.2020 | 100 | $D_2$ peak at 104° C., HD at 115° C.,$H_2$ at 126° C. |
| 52 | Cd-Rho | 30 | High | 0.63 | 3.4 | 0.2 | 1.0 | 0.1878 | 29 | $H_2$ off at 120° C. |
| 53 | Cd-Rho | 30 | High | 0.85 | 4.0 | 0.33 | 1.6 | 0.2111 | 39 | Similar to 52 |
| 54 | Cd-Rho | 30 | High | 0.45 | 2.4 | 0.30 | 1.6 | 0.1878 | 66 | Similar to 52 |
| 55 | Cd-Rho | 30 | High | 0.45 | 2.1 | 0.29 | 1.4 | 0.2111 | 64 | Similar to 52 |
| 56 | Cd-ZK-5 | 30 | High | 1.34 | 5.3 | 0.45 | 1.8 | 0.2516 | 34 | $H_2$ peak at 137° C. |
| 57 | Cd-ZK-5 | 30 | High | 0.07 | 0.2 | 0.05 | 0.2 | 0.2843 | 66 | Thermal desorption to 300° C.; not 400° C. $H_2$ peak at 132° C. |
| 58 | Cd-ZK-5 | 30 | High | 0.09 | 0.3 | 0.06 | 0.2 | 0.2843 | 64 | Similar to 56. $H_2$ peak at 120° C.. |
| 59 | Cd-ZK-5 | 30 | High | 0.22 | 0.9 | 0.08 | 0.3 | 0.2460 | 37 | $H_2$ off at 120° C. |
| 60 | Cd-ZK-5 | 30 | High | 1.56 | 6.3 | 0.53 | 2.2 | 0.2460 | 34 | Similar to 59 |
| 61 | Cd-Mordenite | 30 | High | 23.20 | 83.6 | 4.57 | 16.5 | 0.2775 | 20 | $H_2$ peak at 120° C. |
| 62 | Cd-Mordenite | 200 | High | 34.38 | 123.9 | 9.93 | 35.8 | 0.2775 | 29 | |
| 63 | Cd-Mordenite | 200 | Low | 6.25 | 22.5 | | | 0.2775 | | |
| 64 | Cd-Mordenite | 200 | Low | 19.20 | 69.2 | 12.58 | 45.3 | 0.2775 | 66 | |
| 65 | Cd-Mordenite | 200 | Low | 9.38 | 33.8 | | | 0.2775 | | |
| 66 | Cd-Mordenite | 200 | Low | 4.46 | 16.1 | | | 0.2775 | | |
| 67 | Cd-Mordenite over night | 200 | Low | 25.89 | 93.3 | 14.45 | 52.1 | 0.2775 | 56 | |
| 68 | Cd-Mordenite over weekend | 200 | Low | 11.43 | 41.2 | 13.5 | 48.5 | 0.2775 | 100 | |
| 69 | Cd-Mordenite over weekend | 200 | Low | 22.32 | 80.4 | 10.37 | 37.4 | 0.2775 | 46 | |
| 70 | Cd-Rho | 30 | High | 0.45 | 2.4 | 0.60 | 3.2 | 0.1878 | 100 | $H_2$ peak at 128° C., secondary amount above 320° C. |
| 71 | Cd-Rho | 60 | High | 0.54 | 2.6 | 1.64 | 7.8 | 0.2111 | 100 | Similar to 70.$H_2$ peak at 128° C. accounts for 45% of $H_2$ coming off |
| 72 | Cd-Rho | 60 | High | 2.23 | 10.6 | 2.10 | 9.9 | 0.2111 | 94 | Similar to 70.$H_2$ peak at 133° C. accounts for 10% of $H_2$ coming off |
| 73 | Cd-Rho | 90 | High | 2.00 | 10.6 | 4.56 | 24.3 | 0.1878 | 100 | $H_2$ Peak at 120–160° C. (very small) - $H_2$ coming off > 260° C. |
| 74 | Cd-Rho | 120 | High | 13.40 | 63.5 | 20.70 | 98.1 | 0.2111 | 100 | $H_2$ starts coming off at 140° C. |
| 75 | Cd-Rho | 200 | High | 25.90 | 99.5 | 26.18 | 100.5 | 0.2604 | 101 | $H_2$ peak at 336, low water signal |
| 76 | Cd-Rho | 200 | High | 33.48 | 128.6 | 28.73 | 110.3 | 0.2604 | 86 | $H_2$ peak at 300° C., water starts coming off at ~275° C. |
| 77 | Cd-Rho | 200 | Low | 16.70 | 64.1 | | | 0.2604 | | |
| 78 | Cd-Rho | 200 | Low | 14.70 | 56.5 | 31.10 | 119.4 | 0.2604 | 100 | similar to 76 |

TABLE 8-continued

EXAMPLES 36–90

| Ex. | Prep. Material | $T_a$ °C. | Press. | Chemisorption μmoles | μmoles/g | Temp Prog Chem μmoles | μmoles/g | Dry Wt, g | % TPC/Chem | Remarks |
|---|---|---|---|---|---|---|---|---|---|---|
| 79 | Cd-Rho | 200 | Low | 20.50 | 78.7 | | | 0.2604 | | |
| 80 | Cd-Rho | 200 | Low | 4.46 | 17.1 | | | 0.2604 | | |
| 81 | Cd-Rho over night | 200 | Low | 45.50 | 174.7 | 30.09 | 115.6 | 0.2604 | 66 | similar to 76 |
| 82 | Cd-Rho over weekend | 200 | Low | 42.40 | 162.8 | 32.64 | 125.3 | 0.2604 | 77 | similar to 76 |
| 83 | Cd-Rho over weekend | 200 | Low | 17.86 | 68.6 | 20.57 | 79.0 | 0.2604 | 100 | similar to 76 |
| 84 | Cd-CS (silica) | 30 | High | 2.70 | 13.1 | 3.40 | 16.5 | 0.2059 | 100 | $D_2$ peak at 115° C., HD at 127° C., $H_2$ at 160° C.. |
| 85 | Cd-CS (silica) | 30 | High | 1.70 | 8.3 | 1.50 | 7.3 | 0.2059 | 88 | Similar to 36 |
| 86 | Cd-CS (silica) | 30 | High | 0.85 | 4.1 | | | 0.2059 | | Special run - held sample at 30° C., exposed to 499.74 Torr (66.5 MPa)$H_2$ for 10 min. Final pressure 359.34 Torr (47.8 MPa). Pumped out and exposed to $D_2$ for physisorption. Pumped out and ramped to 400° C.. Adsorbed 25–100% in 10 min vs. Stepwise protocol |
| 87 | "5%" Cd-A | 30 | High | 0.27 | 1.1 | 0.04 | 0.2 | 0.2357 | 15 | Only $H_2$ peak ~160° C. |
| 88 | "10%" Cd-A | 30 | High | 0.49 | 1.9 | 0.38 | 1.S | 0.2514 | 78 | $D_2$, HD, and $H_2$ peaks ~120.HD, and $H_2$ also have peaks 275° C. and 285° C. |
| 89 | "10%" Cd-A | 30 | High | 0.18 | 0.7 | 0.30 | 1.2 | 0.2514 | 100 | Similar to 88 |
| 90 | Cs,Cd-A | 30 | High | 0.45 | 1.5 | 0.59 | 2.0 | 0.2960 | 100 | $D_2$ peak at 135° C., HD 143° C., $H_2$ at 149° C. (shoulder at 240° C. |
| 91 | Cd-CS (silica) | 30 | High | 0.85 | 4.1 | 0.90 | 4.4 | 0.2059 | 100 | $D_2$ peak at 115° C., HD at 134° C., $H_2$ at 138° C. |

TABLE 9

COMPARATIVE EXAMPLES 92–94

| Ex. | Prep. Material | $T_a$ °C. | Press. | Chemisorption μmoles | μmoles/g | Temp Prog. Chem μmoles | μmoles/g | Dry Wt, g | % TPC/Chem | Remarks |
|---|---|---|---|---|---|---|---|---|---|---|
| 92 | Cs-A | 30 | High | 0.00 | 0.0 | 0.00 | 0.0 | 0.2401 | | |
| 93 | 4A (Na) | 30 | High | 0.13 | 0.5 | 0.00 | 0.0 | 0.25 | 0 | No hydrogen peaks |
| 94 | 5A (Ca) | 30 | High | 0.06 | 0.2 | 0.00 | 0.0 | 0.25 | 5 | $H_2$ and $D_2$ total is ~0.004 μmoles - both come off at 106° C. |

Although particular embodiments of the present invention have been described in the foregoing description, it will be understood by those skilled in the art that the invention is capable of numerous modifications, substitutions and rearrangement without departing from the spirit or essential attributes of tee invention Reference should be made to the appended claims, rather than to the foregoing specification, as indicating the scope of the invention.

What is claimed is:

1. A method of separating and removing hydrogen from a hydrogen-containing process stream comprising the steps of:

a) contacting a hydrogen-containing process stream with a Cd containing zeolite, silica, alumina, carbon or clay composition, with the proviso that said zeolite is not rho zeolite, b) selectively encapsulating the hydrogen to form a hydrogen-encapsulated composition; and c) releasing the hydrogen from the hydrogen-encapsulated composition by heating the composition and/or by reducing the surrounding pressure of the composition.

2. The method of claim 1 wherein the Cd-containing zeolite, silica, alumina, carbon or clay composition contains at least 1.6 wt. % of cadmium.

3. The method of claim 1 wherein the Cd-zeolite, silica, alumina, carbon or clay containing composition is Cd-mordenite zeolite.

4. The method of claim 1 wherein said contacting occurs at a pressure between about 1 and about 900 atmospheres and a temperature between about 20 and 500° C.

5. The method of claim 1 wherein the process stream contains hydrogen in concentrations of from about 0.0001 to about 15 wt. %.

6. The method of claim 1 wherein the hydrogen-containing process stream also contains at least one gaseous member selected from the group consisting of HCl, HF, HBr, HI, $Cl_2$, $N_2$, CO, $CO_2$, Ne, Ar, Kr, Xe, He, $NH_3$, $CH_4$, air and $H_2O$.

7. The method of claim 1 wherein the hydrogen-containing process stream resulted from the hydrodechlorination of halocarbons.

8. The method of claim 1 wherein the hydrogen-containing process stream resulted from the processing or production of chlorinated compounds.

9. The method of claim 1 wherein the hydrogen-containing process stream resulted from a plasma-chemical process involving hydrogen.

10. The method of claim 1 wherein the hydrogen-containing process stream resulted from the production of HCN.

11. A method for the reversible storage of hydrogen comprising the steps of:

a) contacting a hydrogen-containing process stream with a composition which comprises cadmium and a support selected from the group consisting of zeolite, silica, alumina, carbon, clay, and combinations thereof wherein said zeolite is not rho zeolite whereby a hydrogen-encapsulated composition is produced; and b) releasing hydrogen from the hydrogen-encapsulated composition by heating the composition and/or by reducing the surrounding pressure of the composition.

12. The method of claim 11 wherein said heating occurs at a temperature greater than 100° C.

13. The method of claim 11 wherein the pressure is reduced to less than 50 atm (5.05 MPa).

14. The method of claim 11 wherein the pressure is reduced to about 1 atm (0.01 MPa).

15. A composition comprising cadmium and a support selected from the group consisting of zeolite, silica, alumina, carbon, clay, and combinations thereof wherein said composition has hydrogen encapsulated therein and said zeolite is not rho zeolite.

16. The hydrogen-encapsulated composition of claim 15 wherein the encapsulation is performed at a pressure of less than 50 atmospheres (5.05 MPa).

17. The hydrogen-encapsulated composition of claim 5 wherein the composition is hydrogen-encapsulated Cd-mordenite zeolite.

* * * * *